(12) United States Patent
Laifenfeld et al.

(10) Patent No.: US 12,196,860 B2
(45) Date of Patent: Jan. 14, 2025

(54) DEPTH SENSOR CALIBRATION USING INTERNAL REFLECTIONS

(71) Applicant: APPLE INC., Cupertino, CA (US)

(72) Inventors: Moshe Laifenfeld, Haifa (IL); Zeev Roth, Kadima-Tsoran (IL)

(73) Assignee: APPLE INC., Cupertino, CA (US)

( * ) Notice: Subject to any disclaimer, the term of this patent is extended or adjusted under 35 U.S.C. 154(b) by 914 days.

(21) Appl. No.: 17/189,300

(22) Filed: Mar. 2, 2021

(65) Prior Publication Data

US 2022/0283307 A1     Sep. 8, 2022

(51) Int. Cl.
| | | |
|---|---|---|
| G01C 3/08 | (2006.01) | |
| G01S 17/04 | (2020.01) | |
| G01S 17/10 | (2020.01) | |
| G01S 17/89 | (2020.01) | |

(52) U.S. Cl.
CPC .............. G01S 17/89 (2013.01); G01S 17/04 (2020.01); G01S 17/10 (2013.01)

(58) Field of Classification Search
CPC ........... G01S 17/89; G01S 17/04; G01S 17/10
See application file for complete search history.

(56) References Cited

U.S. PATENT DOCUMENTS

| | | | |
|---|---|---|---|
| 4,623,237 A | 11/1986 | Kaneda et al. | |
| 4,757,200 A | 7/1988 | Shepherd | |
| 5,164,823 A | 11/1992 | Keeler | |
| 5,270,780 A | 12/1993 | Moran et al. | |
| 5,373,148 A | 12/1994 | Dvorkis et al. | |
| 5,699,149 A | 12/1997 | Kuroda et al. | |
| 6,301,003 B1 | 10/2001 | Shirai et al. | |

(Continued)

FOREIGN PATENT DOCUMENTS

| | | |
|---|---|---|
| CA | 2605339 C | 10/1994 |
| CN | 201054040 Y | 4/2008 |

(Continued)

OTHER PUBLICATIONS

Zhu et al., "Measurement Method for Real-Time Transmission of Optical Signal Based on Single Photon Detection," Chinese Journal of Lasers, vol. 43, No. 2, pp. 1-6, year 2016.

(Continued)

*Primary Examiner* — Mark Hellner
(74) *Attorney, Agent, or Firm* — MEITAR PATENTS LTD.

(57) ABSTRACT

Depth sensing apparatus includes a radiation source, which emits a first array of beams of light pulses through a window toward a target scene. Objective optics image the target scene onto a second array of sensing elements, which output signals indicative of respective times of incidence of photons. A first calibration, which associates the beams in the first array with respective first locations on the second array onto which the beams reflected from the target scene are imaged, is used in processing the signals in order to measure respective times of flight of the light pulses. A second calibration indicates second locations on which stray radiation is incident on the second array due to reflection of the beams from the window. Upon detecting a change in the second locations relative to the second calibration, the first calibration is corrected so as to compensate for the detected change.

20 Claims, 7 Drawing Sheets

(56) References Cited

U.S. PATENT DOCUMENTS

| | | |
|---|---|---|
| 6,384,903 B1 | 5/2002 | Fuller |
| 6,710,859 B2 | 3/2004 | Shirai et al. |
| 7,126,218 B1 | 10/2006 | Darveaux et al. |
| 7,193,690 B2 | 3/2007 | Ossig et al. |
| 7,303,005 B2 | 12/2007 | Reis et al. |
| 7,405,812 B1 | 7/2008 | Bamji |
| 7,508,496 B2 | 3/2009 | Mettenleiter et al. |
| 7,800,067 B1 | 9/2010 | Rajavel et al. |
| 7,800,739 B2 | 9/2010 | Rohner et al. |
| 7,812,301 B2 | 10/2010 | Oike et al. |
| 7,969,558 B2 | 6/2011 | Hall |
| 8,193,482 B2 | 6/2012 | Itsler |
| 8,259,293 B2 | 9/2012 | Andreou |
| 8,275,270 B2 | 9/2012 | Shushakov et al. |
| 8,279,418 B2 | 10/2012 | Yee et al. |
| 8,355,117 B2 | 1/2013 | Niclass |
| 8,405,020 B2 | 3/2013 | Menge |
| 8,594,425 B2 | 11/2013 | Gurman et al. |
| 8,675,181 B2 | 3/2014 | Hall |
| 8,736,818 B2 | 5/2014 | Weimer et al. |
| 8,766,164 B2 | 7/2014 | Sanfilippo et al. |
| 8,766,808 B2 | 7/2014 | Hogasten |
| 8,891,068 B2 | 11/2014 | Eisele et al. |
| 8,925,814 B1 | 1/2015 | Schneider et al. |
| 8,963,069 B2 | 2/2015 | Drader et al. |
| 9,002,511 B1 | 4/2015 | Hickerson et al. |
| 9,024,246 B2 | 5/2015 | Jiang et al. |
| 9,052,356 B2 | 6/2015 | Chu et al. |
| 9,076,707 B2 | 7/2015 | Harmon |
| 9,016,849 B2 | 8/2015 | Duggal et al. |
| 9,267,787 B2 | 2/2016 | Shpunt et al. |
| 9,335,220 B2 | 5/2016 | Shpunt et al. |
| 9,354,332 B2 | 5/2016 | Zwaans et al. |
| 9,386,299 B2 | 7/2016 | Shpunt et al. |
| 9,465,111 B2 | 10/2016 | Wilks et al. |
| 9,516,248 B2 | 12/2016 | Cohen et al. |
| 9,709,678 B2 | 7/2017 | Matsuura |
| 9,736,459 B2 | 8/2017 | Mor et al. |
| 9,739,881 B1 | 8/2017 | Pavek et al. |
| 9,761,049 B2 | 9/2017 | Naegle et al. |
| 9,786,701 B2 | 10/2017 | Mellot et al. |
| 9,810,777 B2 | 11/2017 | Williams et al. |
| 9,874,635 B1 | 1/2018 | Eichenholz et al. |
| 10,063,844 B2 | 8/2018 | Adam et al. |
| 10,067,224 B2 | 9/2018 | Moore et al. |
| 10,132,616 B2 | 11/2018 | Wang |
| 10,215,857 B2 | 2/2019 | Oggier et al. |
| 10,269,104 B2 | 4/2019 | Hannuksela et al. |
| 10,386,487 B1 | 8/2019 | Wilton et al. |
| 10,424,683 B1 | 9/2019 | Do Valle et al. |
| 10,613,203 B1 | 4/2020 | Rekow et al. |
| 10,782,393 B2 | 9/2020 | Dussan et al. |
| 11,693,102 B2 * | 7/2023 | Kudla ................ G01S 7/4865 356/4.02 |
| 2001/0020673 A1 | 9/2001 | Zappa et al. |
| 2002/0071126 A1 | 6/2002 | Shirai et al. |
| 2002/0131035 A1 | 9/2002 | Watanabe et al. |
| 2002/0154054 A1 | 10/2002 | Small |
| 2002/0186362 A1 | 12/2002 | Shirai et al. |
| 2004/0051859 A1 | 3/2004 | Flockencier |
| 2004/0135992 A1 | 7/2004 | Munro |
| 2004/0212863 A1 | 10/2004 | Schanz et al. |
| 2005/0018200 A1 | 1/2005 | Guillermo et al. |
| 2006/0044546 A1 | 3/2006 | Lewin et al. |
| 2006/0106317 A1 | 5/2006 | McConnell et al. |
| 2006/0176469 A1 | 8/2006 | O'Connor et al. |
| 2007/0145136 A1 | 6/2007 | Wiklof et al. |
| 2007/0164004 A1 | 7/2007 | Matsuda et al. |
| 2008/0231498 A1 | 9/2008 | Menzer et al. |
| 2009/0009747 A1 | 1/2009 | Wolf et al. |
| 2009/0262760 A1 | 10/2009 | Krupkin et al. |
| 2009/0273770 A1 | 11/2009 | Bauhahn et al. |
| 2009/0275841 A1 | 11/2009 | Melendez et al. |
| 2010/0019128 A1 | 1/2010 | Itzler |
| 2010/0045965 A1 | 2/2010 | Meneely |
| 2010/0096459 A1 | 4/2010 | Gurevich |
| 2010/0121577 A1 | 5/2010 | Zhang et al. |
| 2010/0250189 A1 | 9/2010 | Brown |
| 2010/0286516 A1 | 11/2010 | Fan et al. |
| 2010/0309288 A1 | 12/2010 | Stettner et al. |
| 2011/0006190 A1 | 1/2011 | Alameh et al. |
| 2011/0128524 A1 | 6/2011 | Vert et al. |
| 2011/0181864 A1 | 7/2011 | Schmitt et al. |
| 2011/0279366 A1 | 11/2011 | Lohbihler |
| 2012/0038904 A1 | 2/2012 | Fossum et al. |
| 2012/0075615 A1 | 3/2012 | Niclass et al. |
| 2012/0132636 A1 | 5/2012 | Moore |
| 2012/0153120 A1 | 6/2012 | Baxter |
| 2012/0154542 A1 | 6/2012 | Katz et al. |
| 2012/0176476 A1 | 7/2012 | Schmidt et al. |
| 2012/0249998 A1 | 10/2012 | Eisele et al. |
| 2012/0287242 A1 | 11/2012 | Gilboa et al. |
| 2012/0294422 A1 | 11/2012 | Cheung et al. |
| 2013/0015331 A1 | 1/2013 | Birk et al. |
| 2013/0079639 A1 | 3/2013 | Hoctor et al. |
| 2013/0092846 A1 | 4/2013 | Henning et al. |
| 2013/0107016 A1 | 5/2013 | Federspiel |
| 2013/0208258 A1 | 8/2013 | Eisele et al. |
| 2013/0236171 A1 | 9/2013 | Saunders |
| 2013/0258099 A1 | 10/2013 | Ovsiannikov et al. |
| 2013/0278917 A1 | 10/2013 | Korekado et al. |
| 2013/0300838 A1 | 11/2013 | Borowski |
| 2013/0342835 A1 | 12/2013 | Blacksberg |
| 2014/0027606 A1 | 1/2014 | Raynor et al. |
| 2014/0071433 A1 | 3/2014 | Eisele et al. |
| 2014/0077086 A1 | 3/2014 | Batkilin et al. |
| 2014/0078491 A1 | 3/2014 | Eisele et al. |
| 2014/0162714 A1 | 6/2014 | Kim et al. |
| 2014/0191115 A1 | 7/2014 | Webster et al. |
| 2014/0198198 A1 | 7/2014 | Geissbuehler et al. |
| 2014/0231630 A1 | 8/2014 | Rae et al. |
| 2014/0240317 A1 | 8/2014 | Go et al. |
| 2014/0240691 A1 | 8/2014 | Mheen et al. |
| 2014/0268127 A1 | 9/2014 | Day |
| 2014/0300907 A1 | 10/2014 | Kimmel |
| 2014/0321862 A1 | 10/2014 | Frohlich et al. |
| 2014/0353471 A1 | 12/2014 | Raynor et al. |
| 2015/0041625 A1 | 2/2015 | Dutton et al. |
| 2015/0062558 A1 | 3/2015 | Koppal et al. |
| 2015/0131080 A1 | 5/2015 | Retterath et al. |
| 2015/0163429 A1 | 6/2015 | Dai et al. |
| 2015/0192676 A1 | 7/2015 | Kotelnikov et al. |
| 2015/0200222 A1 | 7/2015 | Webster |
| 2015/0200314 A1 | 7/2015 | Webster |
| 2015/0204978 A1 | 7/2015 | Hammes et al. |
| 2015/0260830 A1 | 9/2015 | Gosh et al. |
| 2015/0285625 A1 | 10/2015 | Deane et al. |
| 2015/0362585 A1 | 12/2015 | Gosh et al. |
| 2015/0373322 A1 | 12/2015 | Goma et al. |
| 2016/0003944 A1 | 1/2016 | Schmidtke et al. |
| 2016/0041266 A1 | 2/2016 | Smits |
| 2016/0072258 A1 | 3/2016 | Seurin et al. |
| 2016/0080709 A1 | 3/2016 | Viswanathan et al. |
| 2016/0182101 A1 | 6/2016 | Marcovic et al. |
| 2016/0259038 A1 | 9/2016 | Retterath et al. |
| 2016/0259057 A1 | 9/2016 | Ito |
| 2016/0274222 A1 | 9/2016 | Yeun |
| 2016/0334508 A1 | 11/2016 | Hall et al. |
| 2016/0344965 A1 | 11/2016 | Grauer |
| 2017/0006278 A1 | 1/2017 | Vandame et al. |
| 2017/0038459 A1 | 2/2017 | Kubacki et al. |
| 2017/0052065 A1 | 2/2017 | Sharma et al. |
| 2017/0067734 A1 | 3/2017 | Heidemann et al. |
| 2017/0068393 A1 | 3/2017 | Viswanathan et al. |
| 2017/0131388 A1 | 5/2017 | Campbell et al. |
| 2017/0131718 A1 | 5/2017 | Matsumura et al. |
| 2017/0139041 A1 | 5/2017 | Drader et al. |
| 2017/0176577 A1 | 6/2017 | Halliday |
| 2017/0176579 A1 | 6/2017 | Niclass et al. |
| 2017/0179173 A1 | 6/2017 | Mandai et al. |
| 2017/0184450 A1 | 6/2017 | Doylend et al. |
| 2017/0184704 A1 | 6/2017 | Yang et al. |
| 2017/0184709 A1 | 6/2017 | Kenzler et al. |
| 2017/0188016 A1 | 6/2017 | Hudman |

(56) References Cited

U.S. PATENT DOCUMENTS

| | | |
|---|---|---|
| 2017/0219695 A1 | 8/2017 | Hall et al. |
| 2017/0242102 A1 | 8/2017 | Dussan et al. |
| 2017/0242108 A1 | 8/2017 | Dussan et al. |
| 2017/0257617 A1 | 9/2017 | Retterath |
| 2017/0269209 A1 | 9/2017 | Hall et al. |
| 2017/0303789 A1 | 10/2017 | Tichauer et al. |
| 2017/0329010 A1 | 11/2017 | Warke et al. |
| 2017/0343675 A1 | 11/2017 | Oggier et al. |
| 2017/0356796 A1 | 12/2017 | Nishio |
| 2017/0356981 A1 | 12/2017 | Yang et al. |
| 2018/0045816 A1 | 2/2018 | Jarosinski et al. |
| 2018/0059220 A1 | 3/2018 | Irish et al. |
| 2018/0062345 A1 | 3/2018 | Bills et al. |
| 2018/0081030 A1 | 3/2018 | McMahon et al. |
| 2018/0081032 A1 | 3/2018 | Torruellas et al. |
| 2018/0081041 A1 | 3/2018 | Niclass et al. |
| 2018/0081061 A1 | 3/2018 | Mandai et al. |
| 2018/0115762 A1 | 4/2018 | Bulteel et al. |
| 2018/0131449 A1 | 5/2018 | Kare et al. |
| 2018/0167602 A1 | 6/2018 | Pacala et al. |
| 2018/0203247 A1 | 7/2018 | Chen et al. |
| 2018/0205943 A1 | 7/2018 | Trail |
| 2018/0209846 A1 | 7/2018 | Mandai et al. |
| 2018/0259645 A1 | 9/2018 | Shu et al. |
| 2018/0299554 A1 | 10/2018 | Van Dyck et al. |
| 2018/0341009 A1 | 11/2018 | Niclass et al. |
| 2019/0004156 A1 | 1/2019 | Niclass et al. |
| 2019/0011556 A1 | 1/2019 | Pacala et al. |
| 2019/0011567 A1 | 1/2019 | Pacala et al. |
| 2019/0018117 A1 | 1/2019 | Perenzoni et al. |
| 2019/0018118 A1 | 1/2019 | Perenzoni et al. |
| 2019/0018119 A1 | 1/2019 | Laifenfeld et al. |
| 2019/0018143 A1 | 1/2019 | Thayer et al. |
| 2019/0037120 A1 | 1/2019 | Ohki |
| 2019/0056497 A1 | 2/2019 | Pacala et al. |
| 2019/0094364 A1 | 3/2019 | Fine et al. |
| 2019/0170855 A1 | 6/2019 | Keller et al. |
| 2019/0178995 A1 | 6/2019 | Tsai et al. |
| 2019/0257950 A1 | 8/2019 | Patanwala et al. |
| 2019/0277952 A1 | 9/2019 | Beuschel et al. |
| 2019/0361404 A1 | 11/2019 | Mautner et al. |
| 2020/0142033 A1 | 5/2020 | Shand |
| 2020/0233068 A1 | 7/2020 | Henderson et al. |
| 2020/0249324 A1* | 8/2020 | Steinberg ............ G01S 7/497 |
| 2020/0256669 A1 | 8/2020 | Roth et al. |
| 2020/0256993 A1 | 8/2020 | Oggier |
| 2020/0309955 A1 | 10/2020 | Aflaqueire et al. |
| 2020/0314294 A1 | 10/2020 | Schoenlieb et al. |
| 2020/0386890 A1 | 10/2020 | Oggier et al. |
| 2022/0146647 A1 | 5/2022 | Sakazume |

FOREIGN PATENT DOCUMENTS

| | | |
|---|---|---|
| CN | 101401107 A | 4/2009 |
| CN | 103763485 A | 4/2014 |
| CN | 103983979 A | 8/2014 |
| CN | 104730535 A | 6/2015 |
| CN | 104914446 A | 9/2015 |
| CN | 105992960 A | 10/2016 |
| CN | 106405572 A | 2/2017 |
| CN | 110609293 A | 12/2019 |
| DE | 202013101039 U1 | 3/2014 |
| DE | 102015013710 A1 | 4/2017 |
| EP | 2157445 A2 | 2/2010 |
| EP | 2322953 A1 | 5/2011 |
| EP | 2469297 A1 | 6/2012 |
| EP | 2477043 A1 | 7/2012 |
| EP | 2827175 A2 | 1/2015 |
| EP | 3285087 A1 | 2/2018 |
| EP | 3318895 A1 | 5/2018 |
| EP | 3370080 A1 | 9/2018 |
| EP | 3521856 A1 | 8/2019 |
| GB | 2492848 A | 1/2013 |
| JP | 102287113 A | 11/1990 |
| JP | H0567195 A | 3/1993 |
| JP | 09197045 A | 7/1997 |
| JP | H10170637 A | 6/1998 |
| JP | H11063920 A | 3/1999 |
| JP | 2011089874 A | 5/2011 |
| JP | 2011237215 A | 11/2011 |
| JP | 2013113669 A | 6/2013 |
| JP | 2014059301 A | 4/2014 |
| JP | 2020197457 A | 12/2020 |
| JP | 7383558 B2 | 11/2023 |
| KR | 101318951 B1 | 10/2013 |
| TW | 202343020 A | 11/2023 |
| WO | 9008946 A1 | 8/1990 |
| WO | 2007144565 A2 | 12/2007 |
| WO | 2010149593 A1 | 12/2010 |
| WO | 2011041040 A1 | 4/2011 |
| WO | 2012154356 A1 | 11/2012 |
| WO | 2013028691 A1 | 2/2013 |
| WO | 2014066178 A1 | 5/2014 |
| WO | 2015199615 A1 | 12/2015 |
| WO | 2016034408 A1 | 3/2016 |
| WO | 2017106875 A1 | 6/2017 |
| WO | 2018122560 A1 | 7/2018 |
| WO | 2020101576 A1 | 5/2020 |
| WO | 2020109378 A1 | 6/2020 |
| WO | 2020201452 A1 | 10/2020 |
| WO | 2022035549 A1 | 2/2022 |
| WO | 2022244322 A1 | 11/2022 |

OTHER PUBLICATIONS

Yang, "The Study of Phase-Demodulation Range-Finding Techniques Based o SPAD," Chinese Master's Thesis Full-text Database, Engineering Science and Technology, Xiangtan University, pp. 1-63, May 2016.
Zhang, "Structured Light Based Fast and High Accuracy Depth Sensing," China Doctoral Dissertations Full-text Database, Information Science and Technology, University of Science and Technology of China, pp. 1-110, Apr. 2015.
Ionescu et al., "A 3D NIR Camera for Gesture Control of Video Game Consoles," Conference Paper, 2014 IEEE International Conference on Computational Intelligence and Virtual Environments for Measurement Systems and Applications (CIVEMSA), pp. 1-5, year 2014.
U.S. Appl. No. 16/769,346 Office Action dated Aug. 3, 2023.
CN Application # 202010063812.6 Office Action dated Aug. 1, 2023.
IN Application # 202117029897 Office Action dated Mar. 10, 2022.
IN Application # 202117028974 Office Action dated Mar. 2, 2022.
CN Application # 201680074428.8 Office Action dated Jun. 23, 2021.
Zhu Jian, "Research of Simulation of Super-Resolution Reconstruction of Infrared Image", abstract page, Master's Thesis, p. 1, Nov. 15, 2005.
U.S. Appl. No. 16/679,360 Office Action dated Jun. 29, 2022.
EP Application # 22167103.5 Search Report dated Jul. 11, 2022.
CN Application # 201780058088.4 Office Action dated Aug. 23, 2022.
U.S. Appl. No. 16/885,316 Office Action dated Jun. 30, 2022.
U.S. Appl. No. 16/532,513 Office Action dated Aug. 4, 2022.
Charbon et al., "SPAD-Based Sensors", TOF Range-Imaging Cameras, Springer-Verlag, pp. 11-38, year 2013.
Niclass et al., "A 0.18 um CMOS SoC for a 100m range, 10 fps 200×96 pixel Time of Flight depth sensor", IEEE International Solid-State Circuits Conference-(ISSCC), Session 27, Image Sensors, 27.6, pp. 488-490, Feb. 20, 2013.
Walker et al., "A 128×96 pixel event-driven phase-domain $\Delta\Sigma$-based fully digital 3D camera in 0.13μm CMOS imaging technology", IEEE International Solid-State Circuits Conference-(ISSCC), Session 23, Image Sensors, 23.6, pp. 410-412, Feb. 23, 2011.
Niclass et al., "Design and characterization of a 256×64-pixel single-photon imager in CMOS for a MEMS-based laser scanning time-of-flight sensor", Optics Express, vol. 20, issue 11, pp. 11863-11881, May 21, 2012.

(56) References Cited

OTHER PUBLICATIONS

Kota et al., "System Design and Performance Characterization of a MEMS-Based Laser Scanning Time-of-Flight Sensor Based on a 256 × 64-pixel Single-Photon Imager", IEEE Photonics Journal, vol. 5, issue 2, pp. 1-15, Apr. 2013.
Webster et al., "A silicon photomultiplier with >30% detection efficiency from 450-750nm and 11.6μm pitch NMOS-only pixel with 21.6% fill factor in 130nm CMOS", Proceedings of the European Solid-State Device Research Conference (ESSDERC), pp. 238-241, Sep. 7-21, 2012.
Bradski et al., "Learning OpenCV", first edition, pp. 1-50, O'Reilly Media, Inc, California, USA, year 2008.
Buttgen et al., "Pseudonoise Optical Modulation for Real-Time 3-D Imaging With Minimum Interference", IEEE Transactions on Circuits and Systems I: Regular Papers, vol. 54, Issue10, pp. 2109-2119, Oct. 1, 2007.
Morbi et al., "Short range spectral lidar using mid-infrared semiconductor laser with code-division multiplexing technique", Technical Digest, CLEO 2001, pp. 491-492, May 2001.
Al et al., "High-resolution random-modulation cw lidar", Applied Optics, vol. 50, issue 22, pp. 4478-4488, Jul. 28, 2011.
Chung et al., "Optical orthogonal codes: design, analysis and applications", IEEE Transactions on Information Theory, vol. 35, issue 3, pp. 595-604, May 1989.
Lin et al., "Chaotic lidar", IEEE Journal of Selected Topics in Quantum Electronics, vol. 10, issue 5, pp. 991-997, Sep.-Oct. 2004.
Fine et al., U.S. Appl. No. 17/079,548, filed Oct. 26, 2020.
U.S. Appl. No. 16/752,653 Office Action dated Oct. 1, 2021.
EP Application # 17737420.4 Office Action dated Oct. 28, 2021.
KR Application # 1020200068248 Office Action dated Nov. 12, 2021.
KR Application # 1020207015906 Office Action dated Oct. 13, 2021.
U.S. Appl. No. 17/079,548 Office Action dated Mar. 3, 2023.
CN Application # 201780097602.5 Office Action dated Mar. 15, 2023.
CN Application # 202010063812.6 Office Action dated Mar. 18, 2023.
KR Application # 1020217025136 Office Action dated Apr. 4, 2023.
U.S. Appl. No. 17/026,365 Office Action dated Jan. 26, 2023.
CN Application # 201980090098.5 Office Action dated Dec. 4, 2023.
IN Application # 202117028974 Summons to Hearing dated Dec. 8, 2023.
CN Application # 202010521767.4 Office Action dated Dec. 8, 2023.
CN Application # 201980090030.7 Office Action dated Jan. 5, 2024.
CN Application # 201810571820.4 Office Action dated Sep. 9, 2022.
KR Application # 1020220101419 Office Action dated Sep. 28, 2022.
U.S. Appl. No. 17/026,365 Office Action dated Nov. 7, 2022.
U.S. Appl. No. 16/532,513 Office Action dated Nov. 23, 2022.
U.S. Appl. No. 17/863,412 Office Action dated Nov. 21, 2024.

\* cited by examiner

DEPTH SENSOR CALIBRATION USING INTERNAL REFLECTIONS

FIELD OF THE INVENTION

The present invention relates generally to systems and methods for depth mapping, and particularly to alignment and calibration of beam sources and sensor arrays used in time-of-flight sensing.

BACKGROUND

Existing and emerging consumer applications have created an increasing need for real-time three-dimensional (3D) imagers. These imaging devices, also known as depth sensors, depth mappers, or light detection and ranging (LiDAR) sensors, enable the remote measurement of distance (and often intensity) to each point in a target scene—referred to as target scene depth—by illuminating the target scene with an optical beam and analyzing the reflected optical signal. A commonly-used technique to determine the distance to each point on the target scene involves transmitting one or more pulsed optical beams towards the target scene, followed by the measurement of the round-trip time, i.e. time-of-flight (ToF), taken by the optical beams as they travel from the source to the target scene and back to a detector array adjacent to the source.

Some ToF systems use single-photon avalanche diodes (SPADs), also known as Geiger-mode avalanche photodiodes (GAPDs), in measuring photon arrival time. For example, U.S. Pat. No. 9,997,551, whose disclosure is incorporated herein by reference, describes a sensing device that includes an array of SPAD sensing elements. Each sensing element includes a photodiode, including a p-n junction, and a local biasing circuit, which is coupled to reverse-bias the p-n junction at a bias voltage greater than the breakdown voltage of the p-n junction by a margin sufficient so that a single photon incident on the p-n junction triggers an avalanche pulse output from the sensing element. A bias control circuit is coupled to set the bias voltage in different ones of the sensing elements to different, respective values.

The pulsed optical beams that are used in ToF systems may be emitted by a single source or by an array of sources. Some systems use a "sparse" emitter array, in the sense that the number of pulsed beams of optical radiation that are emitted toward a target scene is substantially less than the number of pixels (i.e., SPADs or other sensing elements) in the array that receives the radiation reflected from the scene.

For example, U.S. Patent Application Publication 2020/0256669, whose disclosure is incorporated herein by reference, describes depth sensing apparatus that includes a radiation source, which emits a first plurality of beams of light pulses toward a target scene. An array of a second plurality of sensing elements outputs signals indicative of respective times of incidence of photons on the sensing element, wherein the second plurality exceeds the first plurality. Light collection optics image the target scene onto the array of sensing elements. Processing and control circuitry receives the signals from the array and searches over the sensing elements in order to identify, responsively to the signals, respective regions of the array on which the light pulses reflected from the target scene are incident, and to process the signals from the identified regions in order determine respective times of arrival of the light pulses.

The terms "optical radiation" and "light" are used in the context of the present description and in the claims to refer to electromagnetic radiation in any of the visible, infrared, and ultraviolet spectral ranges.

SUMMARY

Embodiments of the present invention that are described hereinbelow provide improved depth mapping systems and methods for operating such systems.

There is therefore provided, in accordance with an embodiment of the invention, depth sensing apparatus, which includes a transparent window. A radiation source is configured to emit a first array of beams of light pulses through the window toward a target scene. An imaging assembly includes a second array of sensing elements, configured to output signals indicative of respective times of incidence of photons on the sensing elements, and objective optics configured to image the target scene onto the second array.

Processing and control circuitry is coupled to store a first calibration associating the beams in the first array with respective first locations on the second array onto which the beams reflected from the target scene are imaged, and to process the signals in accordance with the first calibration in order to measure respective times of flight of the light pulses. The processing and control circuitry is configured to store a second calibration indicating second locations on which stray radiation is incident on the second array due to reflection of the beams from the window, and to detect, responsively to the signals, a change in the second locations relative to the second calibration and to correct the first calibration so as to compensate for the detected change.

In some embodiments, the first array includes a first number of the beams, and the second array includes a second number of the sensing elements, wherein the second number is greater than the first number. In the disclosed embodiments, the objective optics are configured to image the target scene sparsely onto the array of sensing elements so that only a subset of the sensing elements output the signals in response to the light pulses reflected from the target scene, and the first calibration indicates the sensing elements that belong to the subset. In one such embodiment, the processing and control circuitry is configured to process the signals output by the sensing elements in the subset in order to measure the respective times of flight, without receiving the signals output by the sensing elements that are not in the subset, and to modify a membership of the subset responsively to the detected change.

Additionally or alternatively, the processing and control circuitry is configured to group the sensing elements in each of the first locations together to define super-pixels, and to process together the signals from the sensing elements in each of the super-pixels in order to measure the respective times of flight.

Further additionally or alternatively, the processing and control circuitry is configured, in accordance with the first calibration, to actuate only the sensing elements at each of the first locations, while the remaining sensing elements in the array are inactive.

In one embodiment, the processing and control circuitry is configured to compute a coordinate transformation relating the second locations indicated by the second calibration to the second locations following the detected change, and to apply the coordinate transformation in correcting the first calibration.

In some embodiments, the radiation source includes at least one vertical-cavity surface-emitting laser (VCSEL) and possibly an array of VCSELs. Additionally or alternatively, the sensing elements include single-photon avalanche diodes (SPADs).

In a disclosed embodiment, the apparatus includes a housing, which contains the radiation source and the imaging assembly and which includes the window, wherein the beams of light exit the housing through the window.

There is also provided, in accordance with an embodiment of the invention, a method for depth sensing, which includes configuring a radiation source to emit a first array of beams of light pulses through a transparent window toward a target scene, and imaging the target scene onto a second array of sensing elements, which output signals indicative of respective times of incidence of photons on the sensing elements. A first calibration is stored, associating the beams in the first array with respective first locations on the second array onto which the beams reflected from the target scene are imaged. The signals are processed in accordance with the first calibration in order to measure respective times of flight of the light pulses. A second calibration is stored indicating second locations on which stray radiation is incident on the second array due to reflection of the beams from the window. Responsively to the signals, a change in the second locations relative to the second calibration is detected, and the first calibration is corrected so as to compensate for the detected change.

The present invention will be more fully understood from the following detailed description of the embodiments thereof, taken together with the drawings in which:

DETAILED DESCRIPTION OF EMBODIMENTS

Overview

In some of the embodiments described in the above-mentioned U.S. Patent Application Publication 2020/0256669, SPADs are grouped together into "super-pixels," wherein the term "super-pixel" refers to a group of mutually-adjacent pixels along with data processing elements that are coupled directly to these pixels. At any instant during operation of the system, only the sensing elements in the area or areas of the array that are to receive reflected illumination from a beam are actuated, for example by appropriate biasing of the SPADs in selected super-pixels, while the remaining sensing elements are inactive. The sensing elements are thus actuated only when their signals provide useful information. This approach reduces the background signal, thus enhancing the signal-to-background ratio, and lowers both the electrical power needs of the detector array and the number of data processing units that must be attached to the SPAD array.

One issue to be resolved in a depth mapping system of this sort is the sizes and locations of the super-pixels to be used. For accurate depth mapping, with high signal/background ratio, it is important that the super-pixels contain the detector elements onto which most of the energy of the reflected beams is imaged, while the sensing elements that do not receive reflected beams remain inactive. A mapping of SPAD pixels to processing units, i.e., the assignment of SPAD pixels to super-pixels, may be determined initially during a factory calibration. Temperature changes during operation, as well as mechanical shocks, however, may alter the mechanical parameters of the mapping, thus modifying the positions of the laser spots on the SPAD array and necessitating recalibration during operation in the field.

In response to this problem, U.S. Patent Application Publication 2020/0256669 describes methods for calibrating the locations of the reflected laser spots on the SPAD array. In these methods, processing and control circuitry receives timing signals from the SPAD array and searches over the sensing elements in order to identify the respective regions of the array on which the light pulses reflected from the target scene are incident. This search process, however, can be time-consuming, and the actual depth mapping operation cannot begin until the search is completed.

Embodiments of the present invention that are described herein provide improved methods for verifying and updating the calibration of the locations of the laser spots on an array of single-photon detectors, as well as devices implementing these improved methods. These methods make use of stray radiation that is reflected from an optical window, such as the window of a housing containing the radiation source and the imaging assembly. The term "stray radiation" refers to the small fraction of photons that are emitted by the radiation source and reflect back directly from the window to particular locations on the array of sensing elements. These stray photons can be identified readily, since their times of flight are much shorter than those of photons reflected from the target.

The locations at which the stray photons are incident on the array of sensing elements are fixed by the relative positions and geometry of the illumination and sensing assemblies in the depth sensing device. Consequently, any change in these locations is a reliable indicator that the internal alignment of the device has changed. Upon detecting such a change, processing and control circuitry in the device can immediately correct the calibration of the locations of the laser spots reflected from the target scene. In some cases, the circuitry is able to compute a coordinate transformation relating the previous locations of the stray reflections on the array of sensing elements, as indicated by the existing calibration, to the new locations following the detected change, and can then apply this coordinate transformation in correcting the calibration. Even when it is not possible to compute and apply such a transformation, the detection of the change in the stray reflections can prompt the processing and control circuitry to initiate a new search in order to update the calibration.

The disclosed embodiments thus provide depth sensing apparatus, which comprises a transparent window, a radiation source, and an imaging assembly. The radiation source emits a first array of beams of light pulses through the window toward a target scene. The imaging assembly comprises a second array of sensing elements, which output signals indicative of respective times of incidence of photons on the sensing elements, along with objective optics, which image the target scene onto the array of sensing elements. Processing and control circuitry in the apparatus stores and uses a dual calibration in processing these signals:

A first calibration associates the beams in the first array with respective locations on the second array onto which the beams reflected from the target scene are imaged. The processing and control circuitry processes the signals output by the sensing elements, in accordance with this first calibration in order to measure respective times of flight of the light pulses and thus sense the depths of points in the target scene.

A second calibration indicates the locations on which stray radiation is incident on the array of sensing elements due to reflection of the beams from the window. In response to the signals output by the sensing elements, the processing and control circuitry is able to detect changes in the locations on which the stray radiation is incident relative to the second calibration. Upon detecting such a change, the processing and control circuitry corrects the first calibration, as explained above, in order to compensate for the detected change.

System Description

Figure 1:
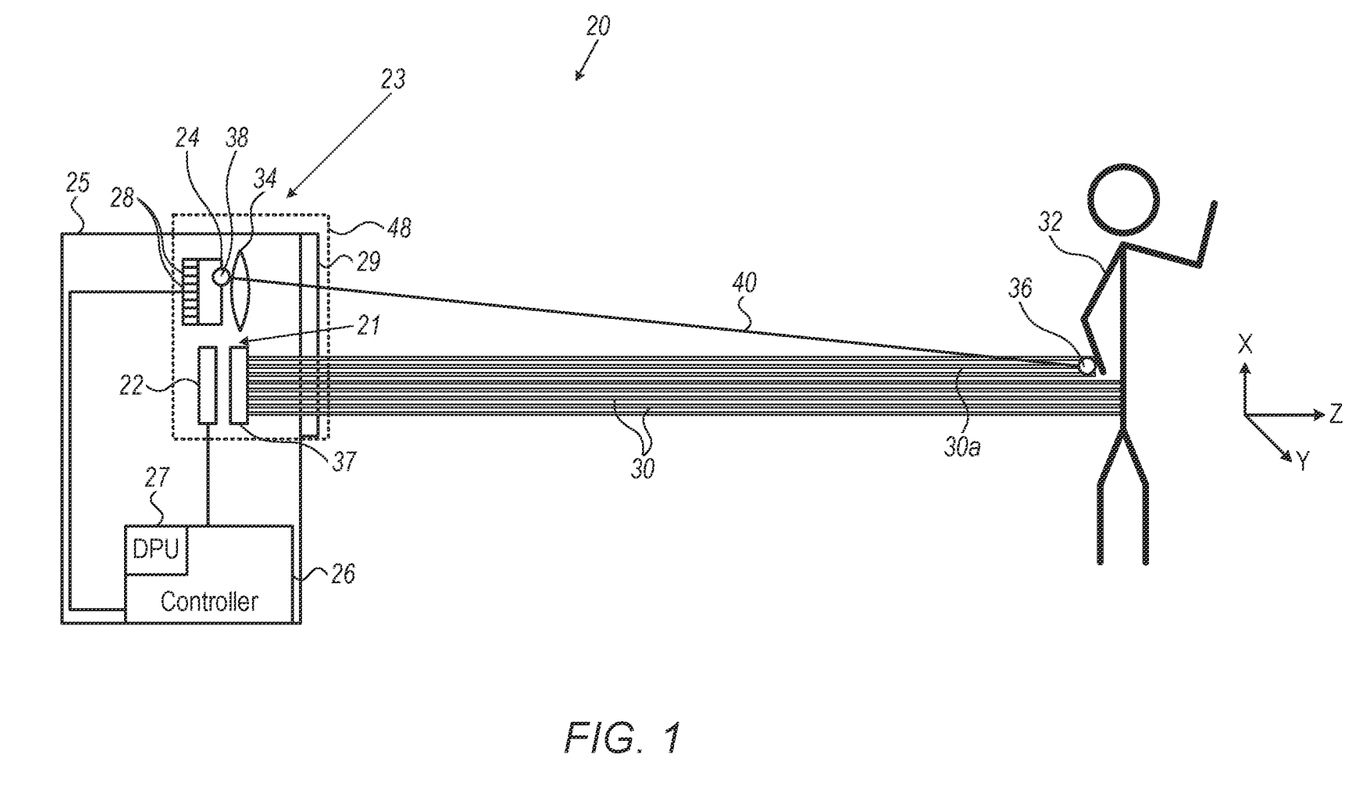
FIG. 1 is a schematic side view of a depth mapping system, in accordance with an embodiment of the invention.

FIG. 1 is a schematic side view of a depth mapping system 20, in accordance with an embodiment of the invention. Depth mapping system 20 comprises a camera module 48, which comprises a radiation source 21 and an imaging assembly 23. The elements of camera module 48 are contained in a housing 25, which comprises a transparent window 29 through which optical radiation exits and enters the housing.

Radiation source 21 emits M individual beams 30 (for example, M may be on the order of 500). The radiation source typically comprises one or more banks of emitters arranged in a two-dimensional emitter array 22, together with beam optics 37. The emitters typically comprise solid-state devices, such as vertical-cavity surface-emitting lasers (VCSELs) or other sorts of lasers or light-emitting diodes (LEDs). Beam optics 37 typically comprise a collimating lens and may comprise a diffractive optical element (DOE, not shown), which replicates the actual beams emitted by array 22 to create the M beams that are projected onto a target scene 32. For the sake of simplicity, these internal elements of beam optics 37 are not shown.

Imaging assembly 23 comprises a two-dimensional array 24 of sensing elements, for example single-photon detectors, such as SPADs. Imaging assembly 23 also comprises J processing units 28, along with select and readout circuits (not shown) for coupling the processing units to the sensing elements and to a controller 26. Array 24 comprises a number of sensing elements N that is much larger than M, for example, 100×100 pixels or 200×200 pixels. The number J of processing units 28 depends on the number of pixels of array 24 to which each processing unit is coupled. These features of imaging assembly 23 and their operation are described in greater detail in the above-mentioned U.S. Patent Application Publication 2020/0256669.

Radiation source 21 emits the M pulsed beams 30 of light through window 29 toward target scene 32. Although beams 30 are depicted in FIG. 1 as parallel beams of constant width, each beam diverges as dictated by diffraction. Furthermore, beams 30 diverge from each other so as to cover a required area of scene 32. Scene 32 reflects or otherwise scatters those beams 30 that impinge on the scene. The reflected and scattered beams returning from scene 32 through window 29 are collected by objective optics 34, represented by a lens in FIG. 1, which form an image of scene 32 on array 24. Thus, for example, a small region 36 on scene 32, on which a beam 30a has impinged, is imaged onto a small area 38 on array 24.

For clarity, processing units 28 are shown as if separate from array 24, but in practice they may be integrated with array 24 along with other processing and readout circuits. Processing units 28 comprise hardware amplification and logic circuits, which sense and record pulses output by the sensing elements in respective super-pixels, and thus measure the times of arrival of the photons that gave rise to the pulses, as well as the strengths of the optical pulses impinging on array 24. The processing units and associated circuits may assemble histograms of the times of arrival of multiple pulses emitted by array 22, and thus output signals that are indicative of the distance to respective points in scene 32, as well as of signal strength. Circuitry that can be used for this purpose is described, for example, in the above-mentioned U.S. Patent Application Publication 2020/0256669. Alternatively or additionally, some or all of the components of processing units 28 and other processing circuitry may be separate from array 24 and may, for example, be integrated with controller 26. For the sake of generality, controller 26, processing units 28, and the associated processing and readout circuitry are collectively referred to herein as "processing and control circuitry."

Controller 26 is coupled to both radiation source 21 and imaging assembly 23. Controller 26 actuates the emitters in array 22 to emit the pulsed beams. The controller also provides control signals to imaging assembly 23 and receives output signals from processing units 28. The output signals may comprise histogram data, as noted earlier, and may be used by controller 26 to derive both times of incidence and signal strengths at the location of each laser spot that is imaged onto array 24.

To make optimal use of the available sensing and processing resources, controller 26 identifies the respective locations on array 24 on which the pulses of optical radiation reflected from corresponding regions of target scene 32 are imaged by lens 34, and groups the sensing elements into super-pixels that correspond to these locations. The signals output by sensing elements outside these areas are not used, and these sensing elements may thus be deactivated, for example by reducing or turning off the bias voltage to these sensing elements. Methods for choosing the super-pixels initially and for verifying and updating the selection of super-pixels are described, for example, in the above-mentioned U.S. Patent Application Publication 2020/0256669.

For clarity, the dimensions of arrays 22 and 24 have been exaggerated in FIG. 1 relative to scene 32. The lateral separation between arrays 22 and 24, referred to as the "baseline," is in reality much smaller than the distance from emitter array 22 to scene 32. Consequently a chief ray 40 (a ray passing through the center of objective optics 34) from scene 32 to array 24 is nearly parallel to rays 30, leading to only a small amount of parallax.

Controller 26 typically comprises a programmable processor, which is programmed in software and/or firmware to carry out the functions that are described herein. Alternatively or additionally, controller 26 comprises hard-wired and/or programmable hardware logic circuits, which carry out at least some of the functions of the controller. Although controller 26 is shown in the figure, for the sake of simplicity, as a single, monolithic functional block, in practice the controller may comprise a single chip or a set of two or more chips, with suitable interfaces for receiving and outputting the signals that are described herein.

One of the functional units of controller 26 is a depth processing unit (DPU) 27, which processes signals output by processing units 28 in order to calculate the times of flight of the photons in each of beams 30, and thus maps the corresponding distances to the points in target scene 32. This mapping is based on the timing of the emission of beams 30 by emitter array 22 and from the times of arrival (i.e., times of incidence of reflected photons) measured by processing units 28. Controller 26 typically stores the depth coordinates in a memory, and may output the corresponding depth map for display and/or further processing.

Figure 2:
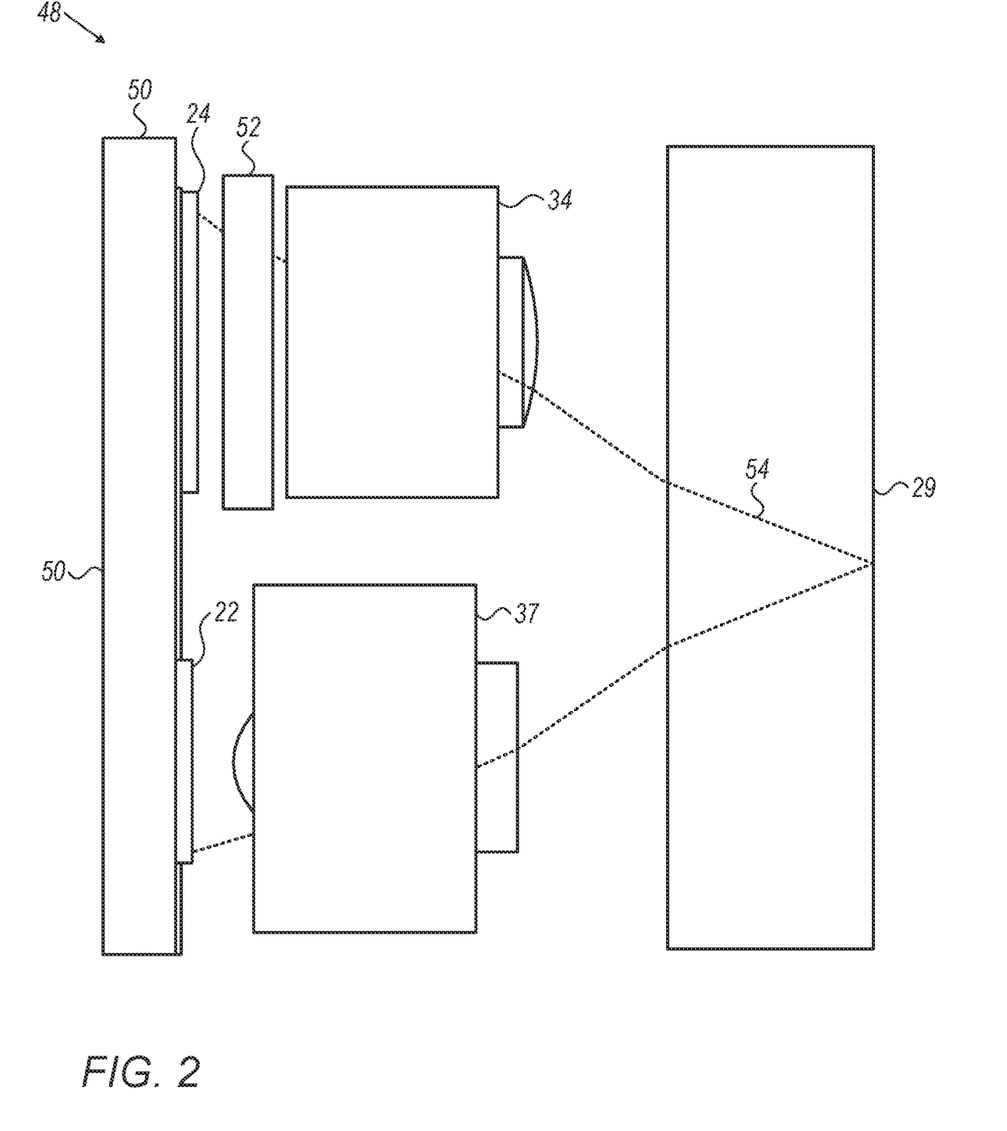
FIG. 2 is a schematic detail view of a camera module used in a depth mapping system, in accordance with an embodiment of the invention.

FIG. 2 is a schematic detail view of camera module 48, in accordance with an embodiment of the invention. Emitter array 22 and sensing array 24 are mounted side by side on a substrate 50, such as a printed circuit board. Beam optics 37 direct the beams emitted from array 22 through window 29 toward the target scene (not shown in this figure). Objective optics 34 image the target scene via a bandpass filter 52 onto sensing array 24.

A number of the beams emitted from array 22, however, are reflected from the outer surface of window 29 back into module 48 as stray beams 54. These stray beams pass through objective optics 34 and filter 52 and are incident on certain sensing elements in array 24 (typically, although not necessarily, at the edge of array 24). The times of flight of the photons in these beams are very short, relative to the times of flight to and from target scene 32 (as shown in FIG. 1). Controller 26 is thus able to distinguish stray beams 54 from the light that is actually returned from the target scene and can also identify readily the locations in array 24 on which the stray beams are incident.

As noted earlier, the locations on array 24 at which stray beams 54 are incident can be stored as part of a process of calibration of camera module 48; and controller 26 can use changes in these locations in correcting the calibration when necessary. A calibration and correction procedure of this sort is described in greater detail hereinbelow with reference to FIG. 4.

In the pictured example, window 29 is sufficiently thick and distant from optics 34 and 37 so that stray beams 54 fall within the field of view of objective optics 34. When the outer surface of window 29 is closer to optics 34 and 37 (for example because a thinner window is used), the stray beams reflected in a single bounce from the outer surface of the window may fall outside the field of view of the objective optics. Even in this case, however, stray beams with sufficient intensity to be used in calibration may reach sensing array 24 after multiple bounces within window 29 or additional reflections from other surfaces within the camera module.

Super-Pixel Selection and Actuation

Figure 3A:
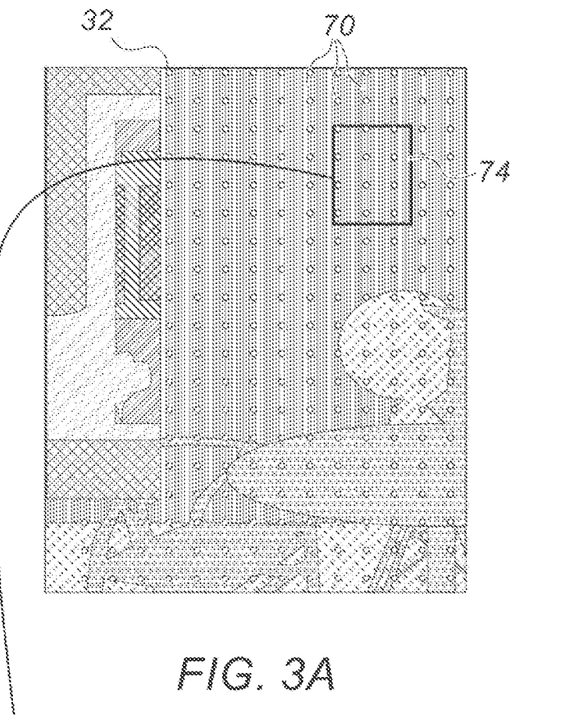
FIG. 3A is a schematic representation of a pattern of spots projected onto a target scene, in accordance with an embodiment of the invention.

FIG. 3A is a schematic representation of a pattern of spots 70 of optical radiation that are projected onto target scene 32, in accordance with an embodiment of the invention. Each spot 70 is cast by a corresponding beam 30 (FIG. 1).

Figure 3B:
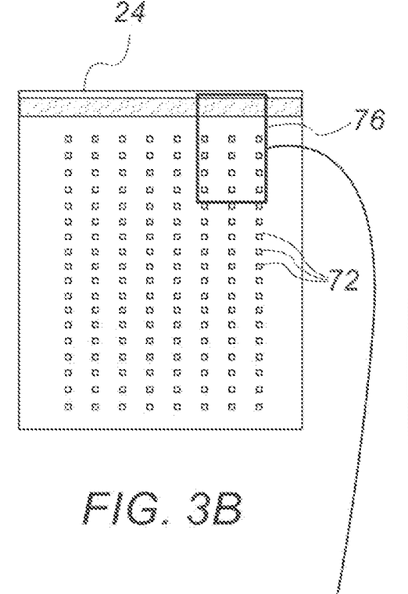
FIG. 3B is a schematic frontal view of a ToF sensing array, in accordance with an embodiment of the invention.

FIG. 3B is a schematic frontal view of sensing array 24 onto which target scene 32 is imaged, in accordance with an embodiment of the invention. The sensing elements, such as SPADs, in array 24 are too small to be seen in this figure. Rather, FIG. 3B shows the locations of spots 72 that are reflected from target scene 32 and imaged onto array 24 by objective optics 34. In other words, each spot 72 is the image on array 24 of a corresponding spot 70 that is projected onto scene 32 by emitter array 22. Optics 34 image a region 74 of target scene 32 (FIG. 3A), including spots 70 that the area contains, onto a corresponding area 76 on array 24.

Figure 3C:
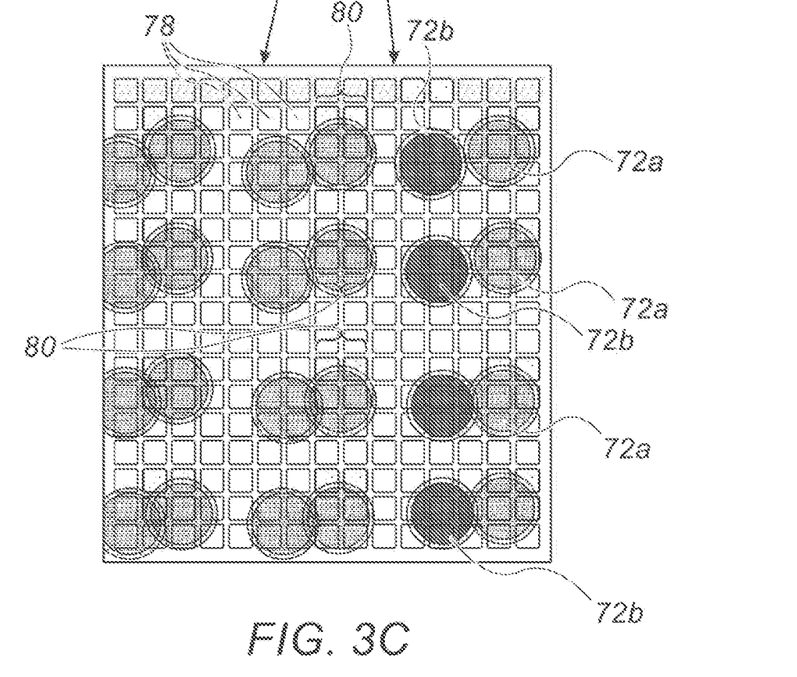
FIG. 3C is a schematic detail view of a part of the ToF sensing array of FIG. 3B, onto which images of the spots in a region of the target scene of FIG. 3A are cast, in accordance with an embodiment of the invention.

FIG. 3C is a schematic detail view of area 76 of array 24, showing the locations of spots 72 that are imaged onto the array, in accordance with an embodiment of the invention. In this view, it can be seen that array 24 comprises a matrix of sensing elements 78, such as SPADs. (As noted earlier, sensing elements 78 in an array are also referred to as "pixels.") Controller 26 assigns each processing unit 28 to a super-pixel 80 comprising a 2×2 group of the sensing elements 78. In this example, it is assumed that during an initial calibration stage, spots 72 were imaged onto array 24 at locations 72a. Controller 26 thus selected the sensing elements 78 to assign to each super-pixel 80 so as to maximize the overlap between the corresponding spot 72 and the super-pixel, and thus maximize the signal received from each super-pixel.

At some later stage, however, spots 72 shifted to new locations 72b on array 24. This shift may have occurred, for example, due to mechanical shock or thermal effects in camera module 48, or due to other causes. Spots 72 at locations 72b no longer overlap with super-pixels 80 in area 76, or overlap only minimally with the super-pixels. Sensing elements 78 on which the spots are now imaged, however, are inactive and are not connected to any of processing units 28. To rectify this situation, controller 26 corrects the calibration of the locations of super-pixels 80, as described below.

Figure 4:
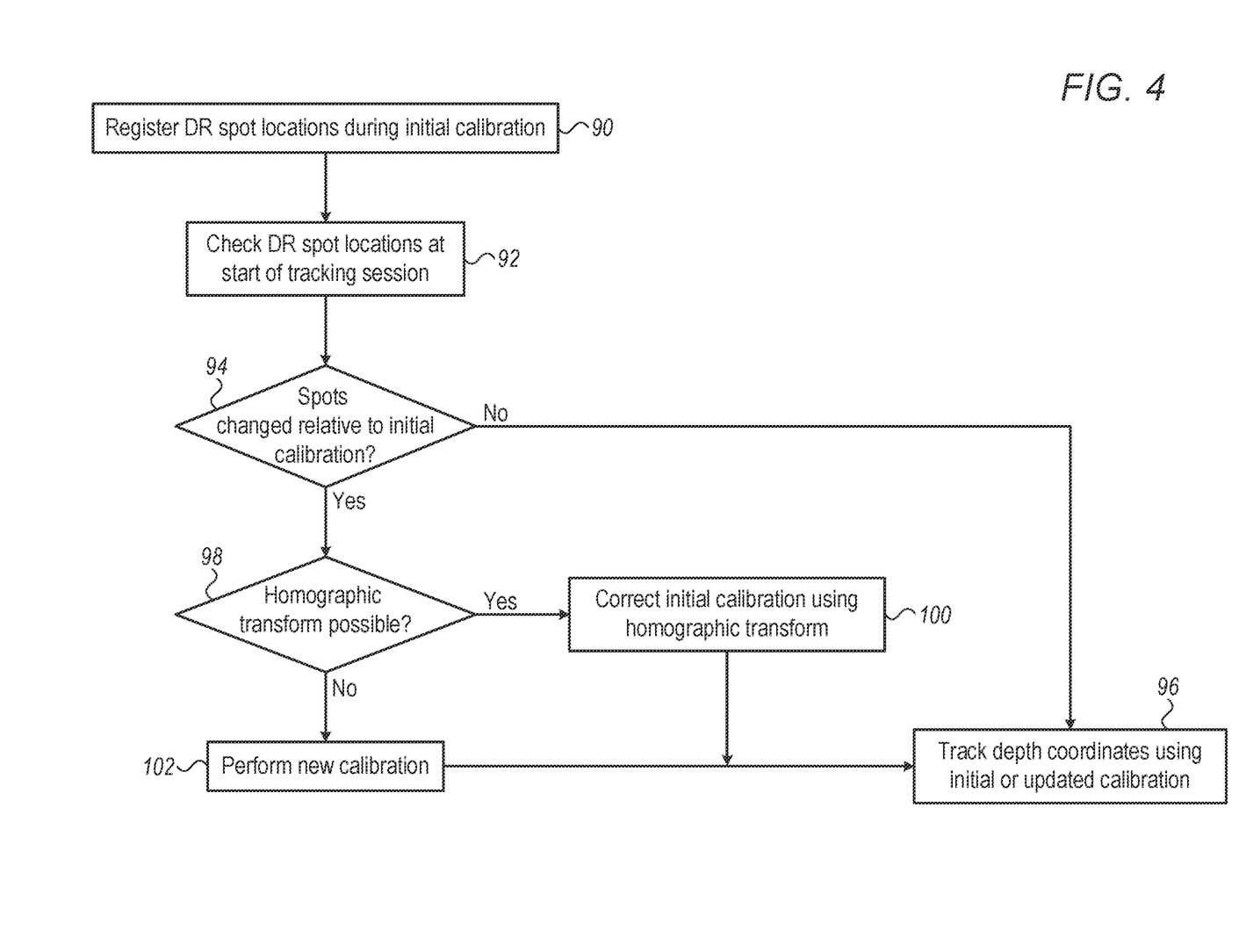
FIG. 4 is a flow chart that schematically illustrates a method for depth mapping, in accordance with an embodiment of the invention.

FIG. 4 is a flow chart that schematically illustrates a method for depth mapping, including calibration and correction when required, in accordance with an embodiment of the invention. This method is described here as one example of how direct reflections of stray beams 54 from a surface such as window 29 (as shown in FIG. 2) can be used in detecting and correcting for certain changes in calibration. Other methods of calibration and correction based on these sorts of direct reflections will be apparent to those skilled in the art after reading the present description and are considered to be within the scope of the present invention.

As an initial step in this method, controller 26 stores an initial calibration, which associates each beam 30 that is emitted by radiation source 22 and forms a spot 70 on target scene 32 with a corresponding location on sensing array 24 onto which the spot is imaged. Procedures for performing this calibration are described in detail in the above-mentioned U.S. Patent Application Publication 2020/0256669. Typically, the calibration is performed initially in the factory, and it may be repeated as and when required in the field, for example when camera module 48 is found to have undergone a major shift in alignment.

As part of this calibration, controller 26 also registers and stores the locations on which stray beams 54 are incident on sensing array 24 following reflection of the stray beams from window 29, at a registration step 90. These stray beams are referred to as "direct reflections" (DR), and the locations at which they impinge on array 24 are referred to as "DR spots." Controller 26 may also store other features of the DR spots, such as the magnitude of the corresponding signals output by the sensing array.

Subsequently, whenever camera module 48 is activated, for example by a user of system 20, controller 26 detects and checks the signals output by sensing array 24 in response to the DR spots before it begins to track depth coordinates of points in target scene 32, at a spot detection step 92. As noted earlier, the DR spots can be identified readily on the basis of their short times of flight, as well as the calibrated locations at which they are incident on sensing array 24. Controller 26 compares the current locations of the DR spots to the locations that were stored as part of the initial calibration, at a change assessment step 94. Additionally or alternatively, at this step controller 26 may compare the magnitudes of the signals output by the sensing array in response to the DR spots.

If the locations and/or magnitudes are unchanged (to within a predetermined tolerance), controller 26 typically goes on to receive and process signals from the appropriate super-pixels 80 in sensing array 24 in order to track the depth coordinates of the target scene, at a tracking step 96. Alternatively or additionally, controller 26 may consider other factors, such as prior failures of system 20 in acquiring a suitable depth map of target scene 32, in deciding whether to proceed to tracking step 96 or to update the calibration of beams 30, as described below.

If the DR spot locations have shifted relative to the stored calibration, controller 26 attempts to compute a coordinate transformation relating the current DR spot locations to the locations that were stored as part of the preceding calibration, at a transform evaluation step 98. For example, the controller may compute a homographic transformation, which accounts for rotation and translation of the set of DR spots from the calibrated to the current DR spot locations, and possibly for changes in scale (magnification), as well. Controller 26 verifies that the transformation is valid, for example by applying the transformation to the calibrated DR spot locations and checking that the variance of the transformed locations relative to the actual, current DR spot locations is within a predefined tolerance. If so, controller 26 applies the coordinate transformation in correcting and updating the stored calibration of beams 30 relative to locations on sensing array 24, at a calibration correction step 100. Thus, for example, the translation and rotation operations of the transformation may be applied to replace locations 72a with locations 72b in the calibration, as illustrated in FIG. 3C. Controller 26 then goes on to receive and process signals from super-pixels 80 in sensing array 24 using the updated calibration in order to track the depth coordinates of the target scene at step 96.

On the other hand, if the DR spots have shifted and it is not possible to compute a valid homographic transformation over the new DR spot locations, controller 26 returns to the initial calibration mode, at a recalibration step 102. In this mode, controller 26 searches over the sensing elements in array 24 in order to find the locations on sensing array 24 onto which spots 70 are imaged. This calibration procedure may follow along the lines described in the above-mentioned U.S. Patent Application Publication 2020/0256669, possibly using the previous calibration as the starting point for the search. The new calibration will also include the updated locations of the DR spots for future reference. Once the calibration is completed, controller 26 continues to tracking mode at step 96.

Alternative Embodiments

Figure 5A:
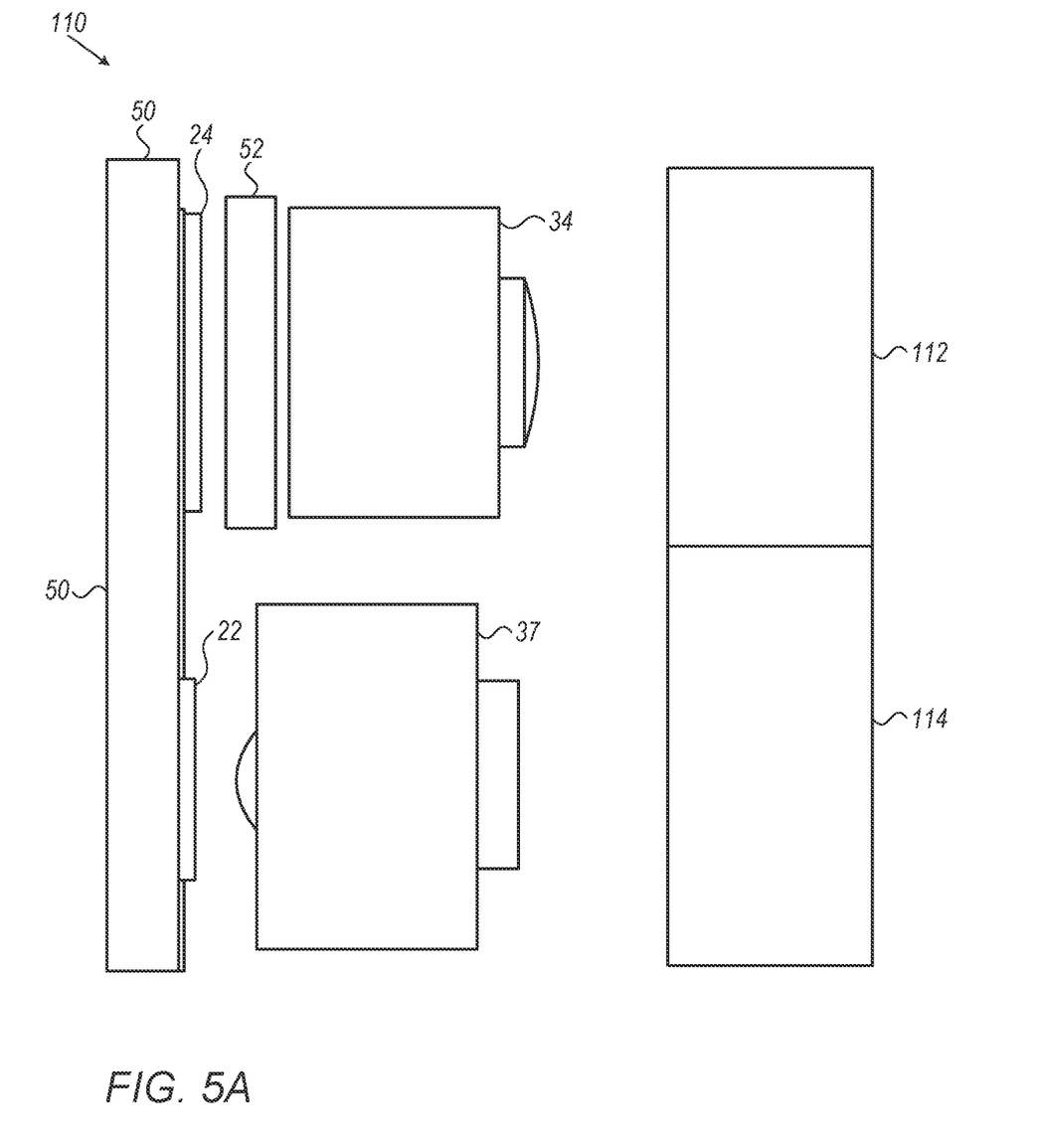
FIGS. 5A-5C are schematic side views of camera modules for use in a depth mapping system, in accordance with alternative embodiments of the invention.
Figure 5B:
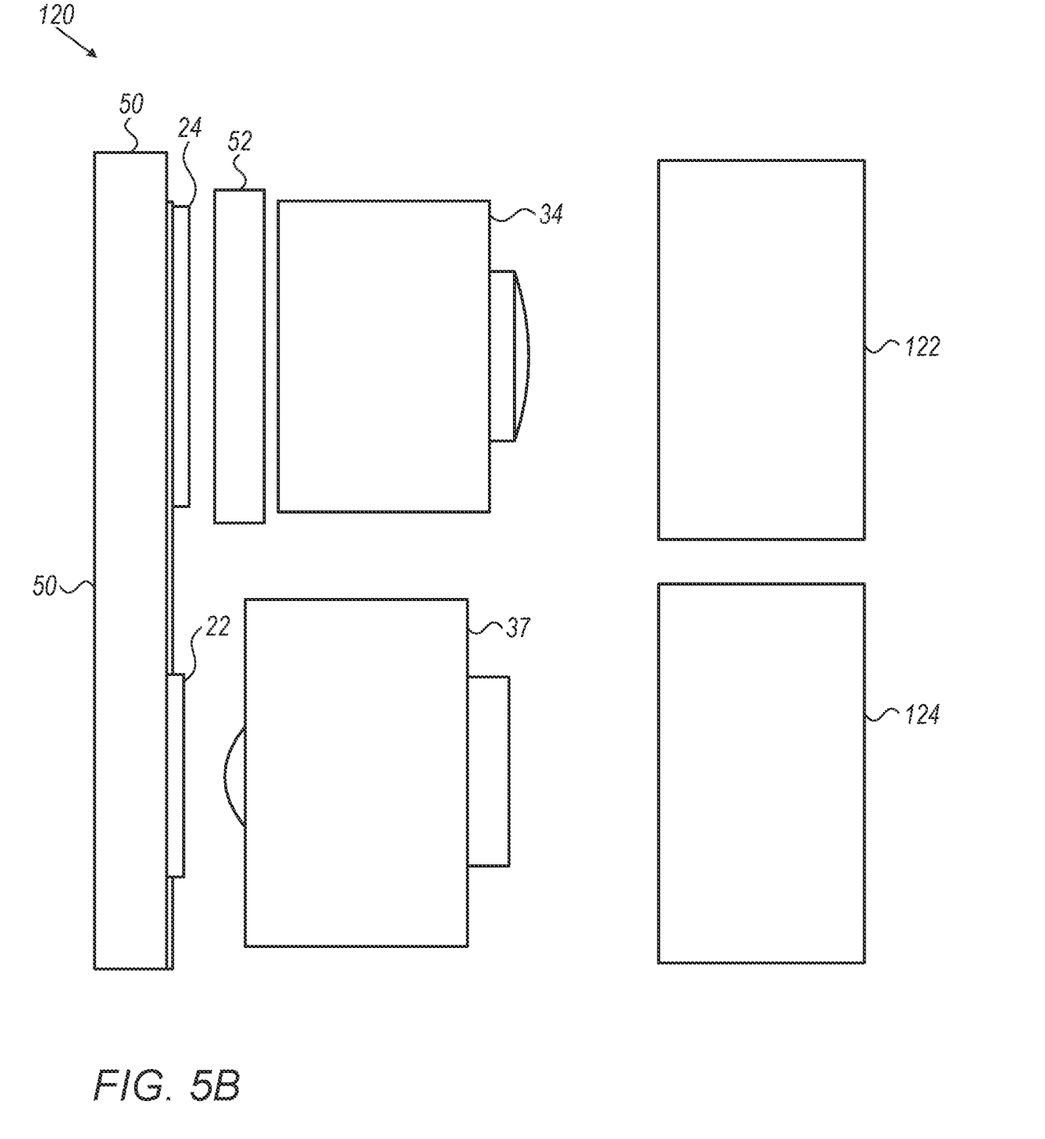

FIG. 5A is a schematic side views of a camera module 110 for use in a depth mapping system, in accordance with an embodiment of the invention. Module 110 may be used, for example, in place of camera module 48 in system 20, and the operation of the system will remain substantially as described above. This embodiment, as well as the embodiment of FIG. 5B, is shown and described here in order to illustrate that the transparent window from which stray radiation reflects onto array 24 of sensing elements need not necessarily be a single, unitary window, but may rather be one of a number of windows. In this example, camera module 110 includes a receive window 112 and a transmit window 114, which are joined together. The stray radiation from emitter array 22 may be reflected from either or both of windows 112 and 114.

FIG. 5B is a schematic side views of a camera module 120 for use in a depth mapping system, in accordance with another embodiment of the invention. Module 120 is similar to module 110, except that it comprises a separate receive window 122 and transmit window 124. Typically (although not necessarily), the stray reflections will come from transmit window 124.

Figure 5C:
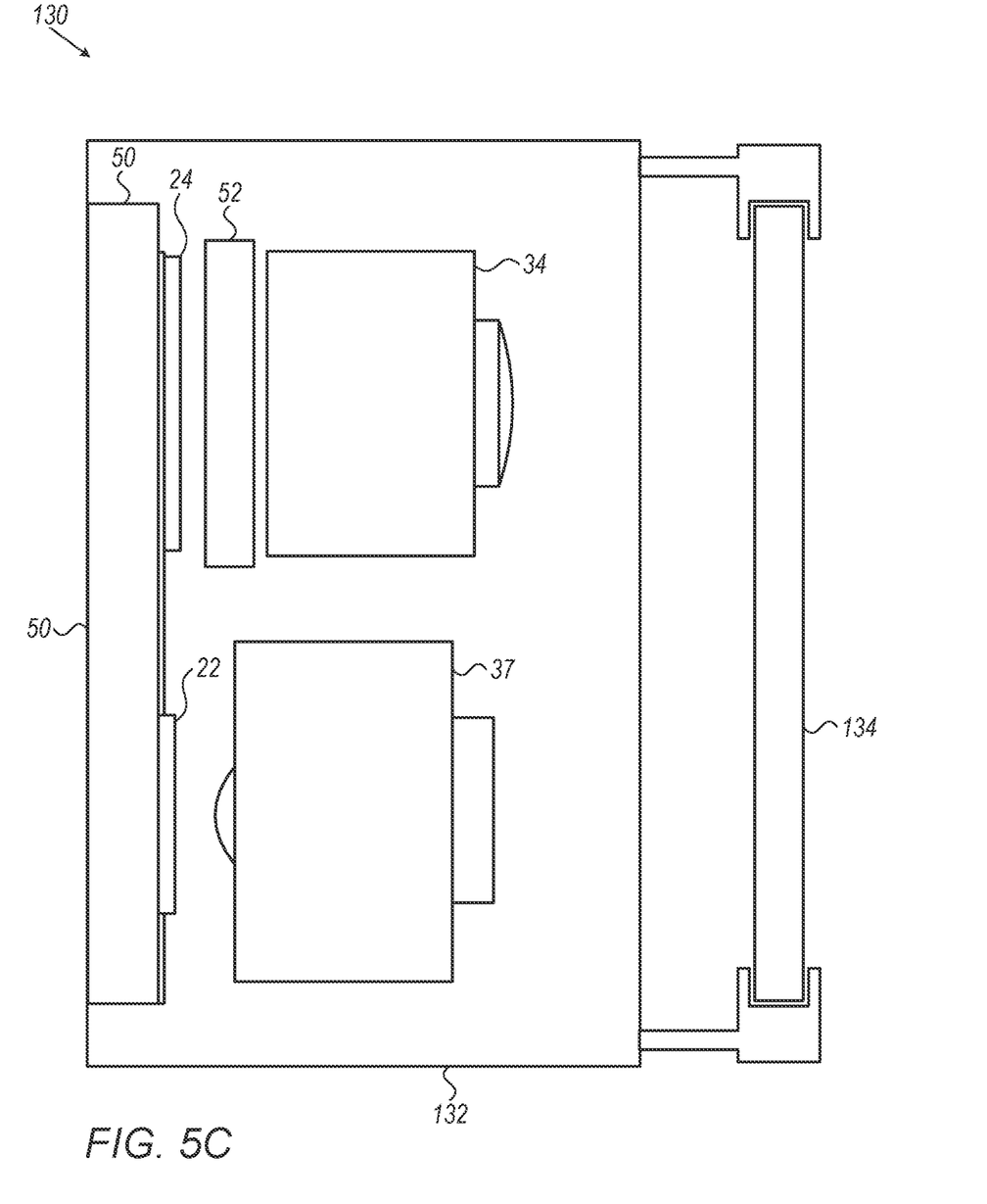

FIG. 5C is a schematic side views of a camera module 130 for use in a depth mapping system, in accordance with yet another embodiment of the invention. Camera module 130 is shown and described here in order to illustrate that a transparent window 134 from which stray radiation reflects onto array 24 of sensing elements need not necessarily be a part of a housing 132 in which the elements of the camera module are contained. In this embodiment, window 134 is external to the camera module housing but still results in stray reflections of the transmitted beams reaching array 24 of sensing elements.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Depth sensing apparatus, comprising:
a transparent window;
a radiation source, which is configured to emit a first array of beams of light pulses through the window toward a target scene;
an imaging assembly, which comprises a second array of sensing elements, configured to output signals indicative of respective times of incidence of photons on the sensing elements, and objective optics configured to image the target scene onto the second array; and
processing and control circuitry, which is coupled to store a first calibration associating the beams in the first array with respective first locations on the second array onto which the beams reflected from the target scene are imaged, and to process the signals output by the sensing elements in accordance with the first calibration in order to measure respective times of flight of the light pulses,
wherein the processing and control circuitry is configured to store a second calibration indicating second locations on which stray radiation is incident on the second array due to reflection of the beams from the window, and to detect, responsively to the signals output by the sensing elements, a change in the second locations relative to the second calibration and to correct the first calibration so as to compensate for the detected change.

2. The apparatus according to claim 1, wherein the first array comprises a first number of the beams, and the second array comprises a second number of the sensing elements, wherein the second number is greater than the first number.

3. The apparatus according to claim 2, wherein the objective optics are configured to image the target scene sparsely onto the array of sensing elements so that only a subset of the sensing elements output the signals in response to the light pulses reflected from the target scene, and wherein the first calibration indicates the sensing elements that belong to the subset.

4. The apparatus according to claim 3, wherein the processing and control circuitry is configured to process the signals output by the sensing elements in the subset in order to measure the respective times of flight, without receiving the signals output by the sensing elements that are not in the subset, and to modify a membership of the subset responsively to the detected change.

5. The apparatus according to claim 2, wherein the processing and control circuitry is configured to group the sensing elements in each of the first locations together to define super-pixels, and to process together the signals from the sensing elements in each of the super-pixels in order to measure the respective times of flight.

6. The apparatus according to claim 1, wherein the processing and control circuitry is configured, in accordance with the first calibration, to actuate only the sensing elements at each of the first locations, while the remaining sensing elements in the array are inactive.

7. The apparatus according to claim 1, wherein the processing and control circuitry is configured to compute a coordinate transformation relating the second locations indicated by the second calibration to the second locations following the detected change, and to apply the coordinate transformation in correcting the first calibration.

8. The apparatus according to claim 1, wherein the radiation source comprises at least one vertical-cavity surface-emitting laser (VCSEL).

9. The apparatus according to claim 8, wherein the at least one VCSEL comprises an array of VCSELs.

10. The apparatus according to claim 1, wherein the sensing elements comprise single-photon avalanche diodes (SPADs).

11. The apparatus according to claim 1, and comprising a housing, which contains the radiation source and the imaging assembly and which comprises the window, wherein the beams of light exit the housing through the window.

12. A method for depth sensing, comprising:
configuring a radiation source to emit a first array of beams of light pulses through a transparent window toward a target scene;
imaging the target scene onto a second array of sensing elements, which output signals indicative of respective times of incidence of photons on the sensing elements;
storing a first calibration associating the beams in the first array with respective first locations on the second array onto which the beams reflected from the target scene are imaged;
processing the signals output by the sensing elements in accordance with the first calibration in order to measure respective times of flight of the light pulses;
storing a second calibration indicating second locations on which stray radiation is incident on the second array due to reflection of the beams from the window;
detecting, responsively to the signals output by the sensing elements, a change in the second locations relative to the second calibration; and
correcting the first calibration so as to compensate for the detected change.

13. The method according to claim 12, wherein the first array comprises a first number of the beams, and the second array comprises a second number of the sensing elements, wherein the second number is greater than the first number.

14. The method according to claim 13, wherein the target scene is imaged sparsely onto the array of sensing elements so that only a subset of the sensing elements output the signals in response to the light pulses reflected from the target scene, and wherein the first calibration indicates the sensing elements that belong to the subset.

15. The method according to claim 14, wherein processing the signals comprises measuring the respective times of flight using the signals output by the sensing elements in the subset without receiving the signals output by the sensing elements that are not in the subset, and
wherein correcting the first calibration comprises modifying a membership of the subset responsively to the detected change in the second locations.

16. The method according to claim 13, wherein processing the signals comprises grouping the sensing elements in each of the first locations together to define super-pixels, and processing together the signals from the sensing elements in each of the super-pixels in order to measure the respective times of flight.

17. The method according to claim 12, and comprising actuating, in accordance with the first calibration, only the sensing elements at each of the first locations, while the remaining sensing elements in the array are inactive.

18. The method according to claim 12, wherein correcting the first calibration comprises computing a coordinate transformation relating the second locations indicated by the second calibration to the second locations following the detected change, and applying the coordinate transformation in correcting the first calibration.

19. The method according to claim 12, wherein the radiation source comprises at least one vertical-cavity surface-emitting laser (VCSEL).

20. The method according to claim 12, wherein the sensing elements comprise single-photon avalanche diodes (SPADs).

* * * * *